US008832628B2

(12) United States Patent
Ma

(10) Patent No.: US 8,832,628 B2
(45) Date of Patent: Sep. 9, 2014

(54) TERMINAL DEVICE AND METHOD FOR REALIZING ANALOGUE CIRCUIT IN TERMINAL DEVICE

(75) Inventor: Weiwei Ma, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/882,009

(22) PCT Filed: Aug. 22, 2011

(86) PCT No.: PCT/CN2011/078726
§ 371 (c)(1),
(2), (4) Date: Apr. 29, 2013

(87) PCT Pub. No.: WO2012/055282
PCT Pub. Date: May 3, 2012

(65) Prior Publication Data
US 2013/0214849 A1 Aug. 22, 2013

(30) Foreign Application Priority Data
Oct. 27, 2010 (CN) .......................... 2010 1 0522840

(51) Int. Cl.
*G06F 17/50* (2006.01)
*H03K 19/003* (2006.01)
(52) U.S. Cl.
CPC .......... *H03K 19/003* (2013.01); *G06F 17/5063* (2013.01)
USPC ............................ 716/117; 716/106; 716/116
(58) Field of Classification Search
CPC ............ G06F 17/5054; G06F 17/5063; G06F 17/5045; G06F 11/20; G06F 17/50; G06F 17/5059; G06F 11/3656; G06F 17/5022; G06F 17/5036; G06F 11/261
USPC ......................................... 716/106, 116, 117
See application file for complete search history.

(56) References Cited

U.S. PATENT DOCUMENTS

| 5,959,871 | A | * | 9/1999 | Pierzchala et al. | 703/4 |
| 2002/0108006 | A1 | * | 8/2002 | Snyder | 710/100 |

(Continued)

FOREIGN PATENT DOCUMENTS

| CN | 101437307 | | 5/2009 |
| CN | 101826045 | A | 9/2010 |

(Continued)

OTHER PUBLICATIONS

International Search Report (Form PCT/ISA/210) for PCT/CN2011/078726, mailed Nov. 24, 2011.
International Preliminary Report on Patentability (Form PCT/IB/373) for PCT/CN2011/078726, dated Apr. 30, 2013, & English translation.

*Primary Examiner* — Jack Chiang
*Assistant Examiner* — Brian Ngo
(74) *Attorney, Agent, or Firm* — Koppel, Patrick Heybl & Philpott; Jaye G. Heybl

(57) ABSTRACT

Disclosed are a terminal device and a method for realizing an analogue circuit in the terminal device. The terminal device includes control device and programmable analogue circuit device. The control device includes: acquisition module, configured to acquire the configuration data information corresponding to the function index and the parameter index of a target analogue circuit, wherein the configuration data information is configured to indicate the on/off state of an interconnection switch between CABs; downloading module, configured to download the configuration data information to the programmable analogue circuit device; and restart module, configured to restart the programmable analogue circuit device. The programmable analogue circuit device includes: a configurable analogue array module, configured to configure the parameters and/or the connection relationship of the CABs by using the configuration data information. The disclosure enhances the fault tolerance of the system, and improves the resource utilization rate.

11 Claims, 4 Drawing Sheets

(56) References Cited

U.S. PATENT DOCUMENTS

| | | |
|---|---|---|
| 2007/0300201 A1 | 12/2007 | Matsumoto et al. |
| 2009/0070514 A1* | 3/2009 | Moriyama et al. ............ 710/311 |
| 2009/0243732 A1* | 10/2009 | Tarng et al. .................... 331/18 |
| 2009/0292939 A1* | 11/2009 | Yasuzato ....................... 713/502 |

FOREIGN PATENT DOCUMENTS

| | | |
|---|---|---|
| CN | 101826045 A | 9/2010 |
| CN | 201583954 | 9/2010 |
| CN | 101976286 A | 2/2011 |
| CN | 101976286 A | 2/2011 |

* cited by examiner

TERMINAL DEVICE AND METHOD FOR REALIZING ANALOGUE CIRCUIT IN TERMINAL DEVICE

FIELD OF THE INVENTION

The disclosure relates to the circuit design field of terminal devices, and in particular to a terminal device and a method for realizing an analogue circuit in the terminal device.

BACKGROUND OF THE INVENTION

The terminal device may have circuit failures after being used for a long time, or used improperly, or being collided. In this case, the analogue circuit failures can be divided into the hard failure and the soft failure according to the properties. The hard failure is also called the large-change failure, representing that the parameter value of the failure component is suddenly changed greatly. It is the change of the component value under two extreme cases, and usually causes serious system failure, and even complete system break down. In other words, it is a structural damage, such as that a component or a connecting line has short circuit or open circuit, or the component is damaged etc. The soft failure is also called the deviation failure, representing that with the change of time or environment conditions, the parameter value of the failure component deviates from the allowed range of value (that is, the parameter value of the component exceeds the tolerance range). Generally, the soft failure does not cause the complete failure of the component. In other words, it is a non-structural damage. The possible states after the soft failure are unlimited.

At present, the analogue circuit part included in the terminal device mainly realizes the analogue functions such as filtering, amplification and the like. Such part of circuit may have failures after being improperly used or being collided. However, in the related technologies, a motherboard of the terminal device usually needs to be replaced, or the damaged circuit device of the motherboard needs to be replaced when handling the circuit failures, which needs long time period, and high human resource cost and material cost, and causes extra resource waste.

SUMMARY OF THE INVENTION

The disclosure provides a solution for realizing an analogue circuit in a terminal device. This solution may at least solve the problem that the failure circuit component needs to be replaced when the terminal device is improperly used or is collided, causing long repair period and high repair cost.

In order to realize the purpose, according to one aspect of the disclosure, a terminal device is provided.

The terminal device according to the disclosure comprises a control device and a programmable analogue circuit device, wherein the control device comprises: an acquisition module, configured to acquire configuration data information corresponding to a function index and a parameter index of a target analogue circuit, wherein the configuration data information is configured to indicate on/off state of an interconnection switch between Configurable Analogue Blocks (CABs); a downloading module, configured to download the configuration data information to the programmable analogue circuit device; and a restart module, configured to restart the programmable analogue circuit device; and the programmable analogue circuit device comprises: a configurable analogue array module, configured to configure a parameter and/or a connection relationship of the CABs by using the configuration data information.

Preferably, the acquisition module is further configured to acquire the configuration data information corresponding to the function index and the parameter index of the target analogue circuit through circuit simulation or manual debugging.

Preferably, the target analogue circuit comprises at least one of: a filter and an amplifier.

Preferably, the configurable analogue array module comprises the CABs, and the CABs comprise at least one of: a programmable capacitor array, a programmable resistor array, an operational amplifier and a programmable switch.

Preferably, the programmable analogue circuit device further comprises: a configuration data storage module, configured to store the configuration data information which is downloaded to the programmable analogue circuit device by the downloading module.

Preferably, the configuration data storage module is a configuration data register.

In order to realize the purpose, according to another aspect, the disclosure also provides a method for realizing an analogue circuit in the terminal device.

The method for realizing an analogue circuit in the terminal device according to the disclosure comprises the steps of: acquiring configuration data information corresponding to a function index and a parameter index of a target analogue circuit, wherein the configuration data information is configured to indicate on/off state of an interconnection switch between Configurable Analogue Blocks (CABs); downloading the configuration data information to a programmable analogue circuit device of the terminal device, wherein the programmable analogue circuit device comprises a configurable analogue array, configured to configure a parameter and/or a connection relationship of the CABs by using the configuration data information; and restarting the programmable analogue circuit device.

Preferably, acquiring the configuration data information corresponding to the function index and the parameter index of the target analogue circuit comprises: acquiring the configuration data information corresponding to the function index and the parameter index of the target analogue circuit through circuit simulation or manual debugging.

Preferably, acquiring the configuration data information corresponding to the function index and the parameter index of the target analogue circuit through circuit simulation comprises: when the analogue circuit in the configurable analogue array has a failure, determining a line and/or a component which have/has the failure according to an input/output signal of the analogue circuit; and establishing a simulation circuit of the target analogue circuit by using the configurable analogue circuit array to bypass the line and/or the component which have/has the failure, and acquiring the configuration data information of the target analogue circuit.

Preferably, establishing the simulation circuit of the target analogue circuit by using the configurable analogue circuit array to bypass the line and/or the component which have/has the failure comprises: using a redundant CAB in the configurable analogue circuit array to replace the CAB which has the failure, and establishing the simulation circuit of the target analogue circuit.

The disclosure configures the parameters and/or connection relationships of the CABs in the terminal device through the configuration data. This solution solves the problem that the failure circuit component needs to be replaced when the terminal device is improperly used or is collided, which may cause long repair period and high repair cost. This solution enhances the fault tolerance of the system and improves the resource utilization rate of the system.

BRIEF DESCRIPTION OF THE DRAWINGS

The drawings described herein are used for further understanding the disclosure, and form a part of the application. The schematic embodiments and the descriptions are used for explaining the disclosure, and not for improperly limiting the disclosure. In the drawings.

DETAILED DESCRIPTION OF THE EMBODIMENTS

The disclosure is described below with reference to the drawings and embodiments in detail. It should note that the embodiments of the application and the features of the embodiments can be combined with each other under the condition of no conflict.

Figure 1:
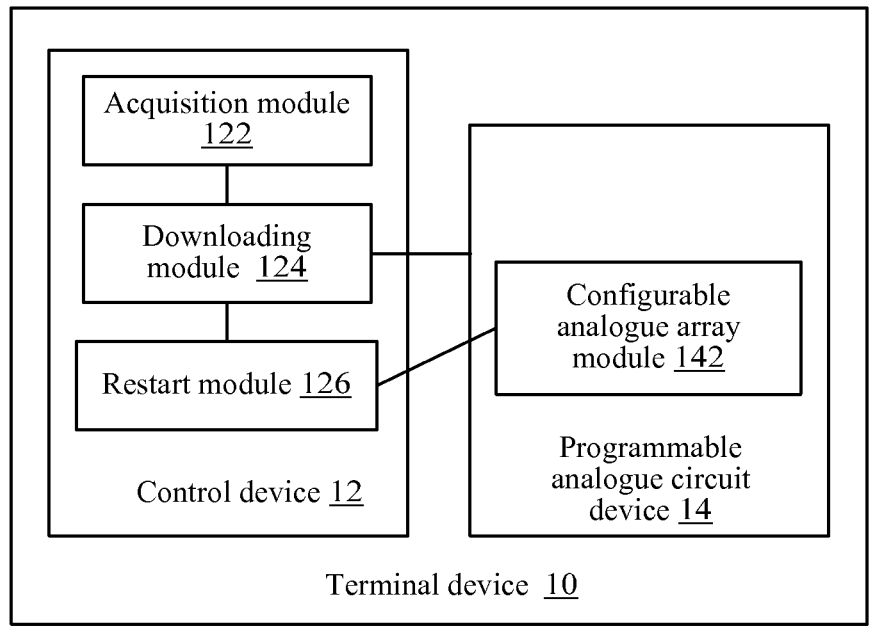
FIG. 1 shows a structure diagram of a terminal device according to an embodiment of the disclosure.

A terminal device is provided according to the embodiment of the disclosure. FIG. 1 shows a structure diagram of a terminal device according to an embodiment of the disclosure. As shown in FIG. 1, the terminal device 10 comprises a control device 12 and a programmable analogue circuit device 14. The control device 12 comprises: an acquisition module 122, configured to acquire the configuration data information corresponding to the function index and the parameter index of a target analogue circuit, wherein the configuration data information is configured to indicate the on/off state of an interconnection switch between the CABs; a downloading module 124, coupled to the acquisition module 122, and configured to download the configuration data information to the programmable analogue circuit device 14; and a restart module 126, coupled to the downloading module 124, and configured to restart the programmable analogue circuit device 14. The programmable analogue circuit device 14 is coupled to the control device 12, and comprises: a configurable analogue array module 142, configured to configure the parameters and/or the connection relationships of the CABs by using the configuration data information.

Through the above device, the parameters and/or connection relationships of the CABs in the terminal device are configured by using the configuration data. This solution may solve the problem that the failure circuit component needs to be replaced when the terminal device is improperly used or is collided, which may cause long repair period and high repair cost. And, this solution enhances the fault tolerance of the system and improves the resource utilization rate of the system.

For example, when the user needs to realize some specific function by using the analogue circuit in the programmable analogue circuit device 14 (it may include the programmable analogue array) of the terminal device, the user first needs to know the function index and the parameter index of the target analogue circuit (namely, the analogue circuit of the specific function which needs to be realized). Then, the user uses the acquisition module 122 to acquire the configuration data information corresponding to the target analogue circuit, uses the downloading module 124 to download the configuration data information to the programmable analogue circuit device 14, and uses the restart module 126 to restart the programmable analogue circuit device 14. The configuration data information can be read when the analogue circuit in the programmable analogue circuit device 14 is restarted, thus to generate the circuit network structure and component parameter corresponding to the configuration data information.

Preferably, the acquisition module 122 is further configured to acquire the configuration data information corresponding to the function index and the parameter index of the target analogue circuit through circuit simulation or manual debugging. Through the method, the configuration parameter of the analogue circuit in the programmable analogue circuit device 14 can be effectively acquired. Thereby, the analogue circuits with different function and parameter indexes can be realized by the user through using the configurable analogue circuit array. Thus, the flexibility and processing capability of the system can be improved.

During the implementation process, when the analogue circuit in the programmable analogue circuit device 14 of the terminal device has a failure, in the case of determining that the failure is caused by the analogue circuit in the programmable analogue circuit device 14, the user can establish a simulation circuit with the same function as the circuit before the failure by using the configurable analogue circuit array module 142 to bypass the line and/or component which have/has the failure through the circuit simulation mode. Thus, the configuration data information corresponding to the realized simulation circuit (namely, the configuration data information of the target analogue circuit) can be acquired. Then, the information can be downloaded to the programmable analogue circuit device 14, so as to generate the circuit network structure and component parameters corresponding to the configuration data information when the analogue circuit in the programmable analogue circuit device 14 is restarted, and to make the restarted programmable analogue circuit device 14 realize the circuit simulation.

Preferably, the target analogue circuit comprises at least one of: a filter and an amplifier. This method can be simply implemented and has high operability.

Preferably, the configurable analogue array module 142 comprises the CAB, wherein the CAB comprises at least one of: a programmable capacitor array, a programmable resistor array, an operational amplifier and a programmable switch. This method improves the configurability of the analogue circuit in the terminal device, saves cost and improves the system performance.

Figure 2:
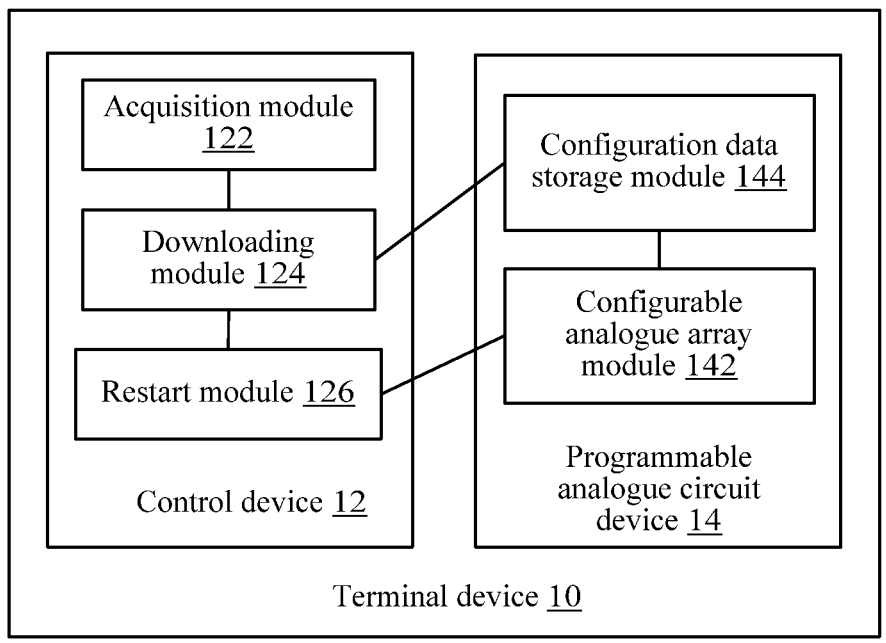
FIG. 2 shows a structure diagram of a terminal device according to a preferred embodiment of the disclosure.

FIG. 2 shows a structure diagram of a terminal device according to a preferred embodiment of the disclosure. As shown in FIG. 2, the programmable analogue circuit device 14 further comprises: a configuration data storage module 144, coupled to the downloading module 124 and the configurable analogue array module 142, and configured to store the configuration data information which is downloaded to the programmable analogue circuit device 14 by the downloading module 124.

In this embodiment, the configuration data information which is downloaded to the programmable analogue circuit device 14 by the downloading module 124 can be stored, which can render the configuration data information be read from the configuration data storage module 144 when the analogue circuit in the programmable analogue circuit device 14 is restarted, so as to generate the circuit network structure and component parameter corresponding to the configuration data information. In view of this, by using the method, the analogue circuit in the configurable analogue circuit array module 142 after being restarted can generate the corresponding circuit network structure and component parameters according to the configuration data information of the configuration data storage module 144. The efficiency and utilization rate of the system can be improved.

Preferably, the configuration data storage module 144 is a configuration data register. This method can be simply implemented and has high operability.

Figure 3:
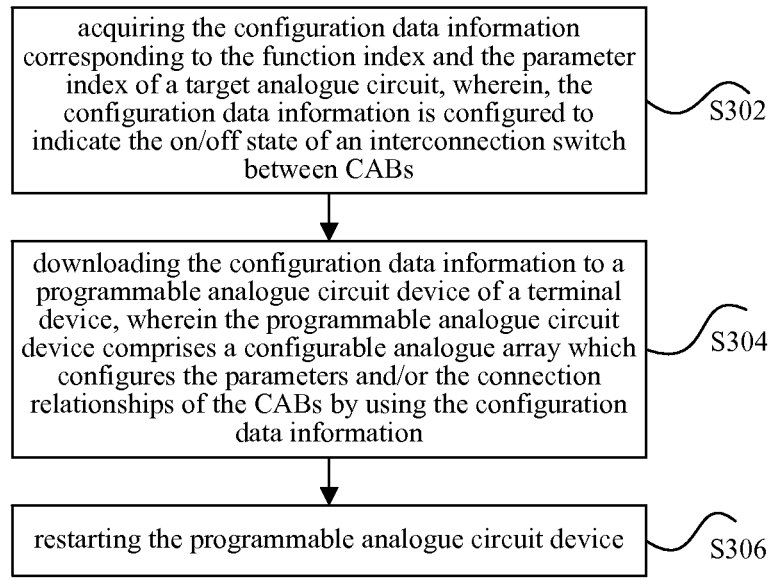
FIG. 3 shows a flowchart of a method for realizing an analogue circuit in the terminal device according to the embodiment of the disclosure.

Corresponding to the above method, the embodiment also provides a method for realizing an analogue circuit in the terminal device. FIG. 3 shows a flowchart of a method for realizing an analogue circuit in the terminal device according to the embodiment of the disclosure. As shown in FIG. 3, the method comprises the following steps.

Step S302, acquiring the configuration data information corresponding to the function index and the parameter index of the target analogue circuit, wherein the configuration data information is configured to indicate the on/off state of an interconnection switch between the CABs.

Step S304, downloading the configuration data information to the programmable analogue circuit device of the terminal device, wherein the programmable analogue circuit device comprises a configurable analogue array which uses the configuration data information to configure the parameters and/or connection relationships of the CABs.

Step S306, restarting the programmable analogue circuit device.

In the above steps, the parameters and/or connection relationships of the CABs in the terminal device are configured by using the configuration data. This solution may solve the problem that the failure circuit component needs to be replaced when the terminal device is improperly used or is collided, which may cause long repair period and high repair cost. The fault tolerance of the system is enhanced, and the resource utilization rate of the system is improved.

For example, the programmable analogue array may include the CABs and the programmable interconnection network.

Preferably, in step S302, the configuration data information corresponding to the function index and the parameter index of the target analogue circuit can be acquired through circuit simulation or manual debugging.

Preferably, acquiring the configuration data information corresponding to the function index and the parameter index of the target analogue circuit through circuit simulation comprises: when the analogue circuit in the configurable analogue array has a failure, determining the line and/or the component which have/has the failure according to the input/output signal of the analogue circuit; establishing a simulation circuit of the target analogue circuit by using the configurable analogue circuit array to bypass the line and/or the component which have/has the failure; and acquiring the configuration data information of the target analogue circuit.

Preferably, establishing a simulation circuit of the target analogue circuit by using the configurable analogue circuit array to bypass the line and/or the component which have/has the failure comprises: using the redundant CAB(s) in the configurable analogue circuit array to replace the CAB(s) which has/have the failure, and establishing the simulation circuit of the target analogue circuit.

In view of this, the above terminal device 10 has the capability of circuit fault tolerance, and the above software and hardware designing method is to improve the design tool, to make the boundary between the traditional hardware and software become blurred by using the reconfiguration of circuitry technique, and to make the hardware system become software-based.

It should be noted that based on the reconfiguration of circuitry technique, the embodiment of the disclosure provides a solution for realizing the analogue circuit design by using an analogue array structure. The main advantage of the design solution is to acquire the specific analogue circuit function through the data configuration mode, to implement fault tolerance for the failure through the data reconfiguration mode when the circuit has a failure, so as to realize the characteristics of fast repairing, replacing the circuit without manual operation etc.

Each of the following specific embodiments combines the features of the above preferred embodiments.

Embodiment 1

Figure 4:
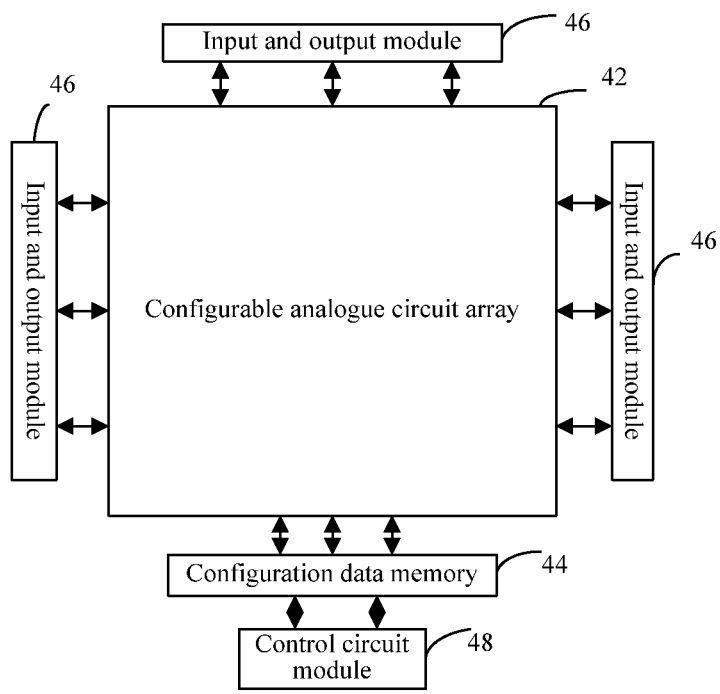
FIG. 4 shows a circuit structure diagram of a configurable analogue circuit according to embodiment 1 of the disclosure.

In this embodiment, a terminal device is provided by using the above design solution of the embodiment of the disclosure. FIG. 4 shows a circuit structure diagram of a configurable analogue circuit according to embodiment 1 of the disclosure. As shown in FIG. 4, the terminal device comprises a programmable analogue array 42, a configuration data memory 44, and an input and output module 46 and a control circuit module 48. Each part is described below in detail.

The programmable analogue array 42 (namely, the configurable analogue array) is configured to realize any interconnection of the circuit structures between the CABs or inside the CABs by configuring the structure of programmable interconnection network, so as to change the circuit structure and realize the specific functions. For example, the CAB can be composed of a programmable capacitor array, a programmable resistor array and an operational amplifier, and some programmable switches. The basic circuit functions such as simple amplification, first-order filter etc. can be realized by using a CAB to open or close the programmable switch, wherein the circuit parameter value can be changed by changing the value of the gain of the contained programmable capacitor, capacitor array and the operational amplifier.

During the implementation process, by designing a highly effective and flexible programmable interconnection network, multiple CABs can be connected together to form a programmable analogue array. Each crossed point of the interconnection network is controlled by a programmable switch. The on/off states of the programmable switch of the CAB and interconnection network can be represented by 0 and 1. Thus there is a string of 0/1 corresponding to a certain connection relationship, which is called as a configuration data string. The circuit connection relationship among multiple CABs is determined by the configuration data string of the interconnection network. The finally-realized circuit function and the specific parameters of the whole analogue circuit are changed by changing the parameter structure of the CAB and the connection relationship among multiple CABs. That is, the configuration data string is stored by the configuration data register 44, and the control circuit part downloads the specific configuration data to the register, thus to form a configurable analogue circuit structure.

The configuration data memory 44 is configured to store the configuration data information which represents the on/off states of all the interconnection switches. For example, the configuration data memory 44 stores the switch states contained in the programmable interconnection network, and directly controls the on/off states thereof.

The input and output module 46 is configured to lead out the circuit signals of specific circuit nodes in the programmable analogue array structure. For example, the input and output module 46 inputs the circuit signals, and leads out the circuit signals of the specifically-needed circuit data nodes.

The control circuit module 48 is configured to download the configuration data from the host to the configuration data memory 44. For example, the control circuit module 48 downloads the specific parameter configuration condition to the configuration data memory 44. It should be noted that the data of the configuration data memory 44 represents the on/off state of each switch position of the circuit array, and different switch connection relationships can influence the characteristics of the analogue circuit in two aspects: the first is the circuit connection relationship between each of the units in the circuit, and the second is the circuit parameters of each single unit.

Embodiment 2

Figure 5:
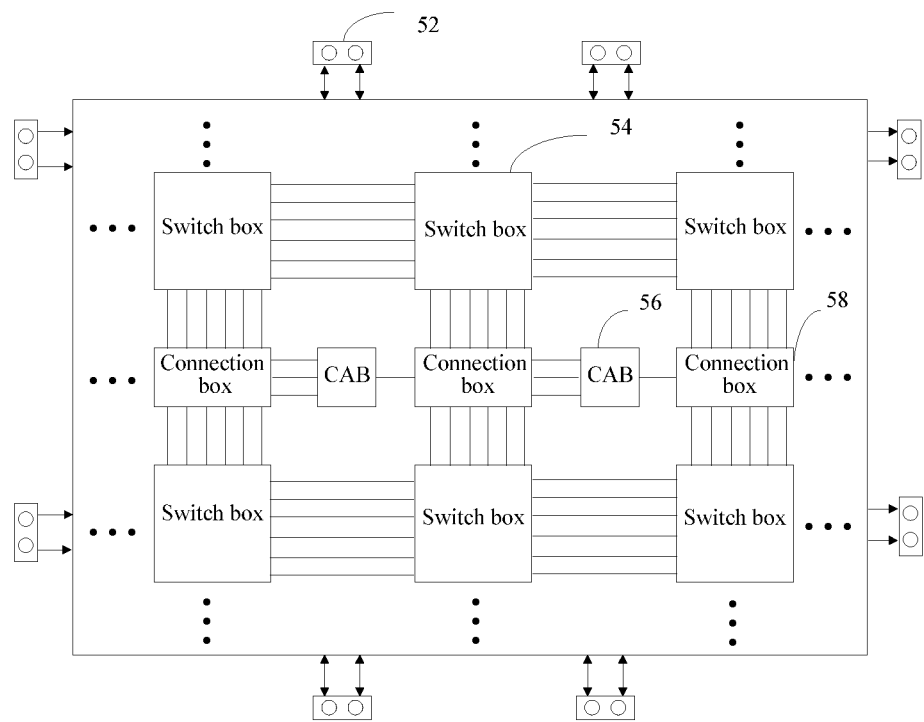
FIG. 5 shows a structure diagram of a programmable analogue array according to embodiment 2 of the disclosure.

FIG. 5 shows a structure diagram of a programmable analogue array according to embodiment 2 of the disclosure. As shown in FIG. 5, the specific circuit structure and function are described below.

The input and output node 52 is configured to lead out the circuit signals of specific circuit nodes of the interconnection network.

The switch box 54 comprises a programmable switch, wherein the programmable switch is configured to realize the interconnection on the horizontal direction between any horizontal line and any vertical line.

The CAB 56 comprises a programmable resistor, a capacitor array, an amplifier, a programmable switch etc., which is the smallest unit for realizing the circuit function.

The connection box 58 is configured to realize the interconnection between the vertical line and the CAB 56.

Embodiment 3

Figure 6:
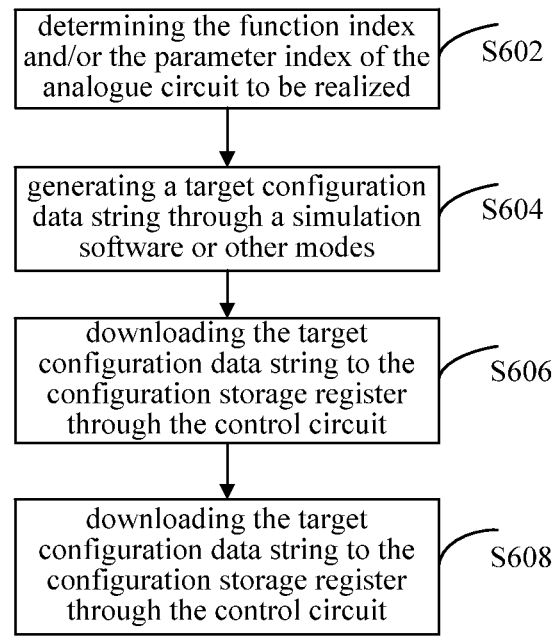
FIG. 6 shows a flowchart of a method for realizing a specific functional analogue circuit according to embodiment 3 of the disclosure.

This embodiment provides a method for using the configurable analogue array structure to realize specific circuit function. FIG. 6 shows a flowchart of a method for realizing a special functional analogue circuit according to embodiment 3 of the disclosure. As shown in FIG. 6, the method for realizing any circuit function in the terminal device comprises the following steps.

Step S602, determining the function index and/or the parameter index of the analogue circuit to be realized. Taking the filter as example, the parameters of the needed filter, such as the order, gain, corner frequency etc. are determined.

Step S604, acquiring the configuration data information of the analogue circuit realizing the objective function through the simulation method or other modes (such as manual debugging). The configuration data information determines the on/off state of each switch of the network. Specifically, a simulation model can be established for the configurable analogue array by using the simulation software, and the parameters of each component in the circuit can be adjusted by configuring the programmable switch, so as to make the finally-acquired equivalent circuit reach the parameter index of the needed function.

Step S606, downloading the configuration information of the target analogue circuit which is to be realized to the configuration data register through the control circuit. In this case, the switch information in the configurable analogue array can be stored in the configuration data register in the binary data mode.

Step S608, restarting the circuit to make the configuration information be effective, generating the new network interconnection relation and component parameters, and finally realizing the function of the target circuit.

Embodiment 4

In this embodiment, first the switch configuration data information for realizing some specific circuit function is acquired through circuit simulation or other modes. The configuration data is downloaded to the configuration data register to realize the circuit with the specific function. The advantage of the configurable analogue circuit lies in the reconfigurable characteristic. This characteristic enables the configurable analogue circuit to be applied in researching the failure repair technique. That is, in the case that the circuit has a failure, the network structure of the circuit can be changed by changing the configuration data of the circuit, so as to bypass the failure unit to realize the circuit failure repair.

Figure 7:
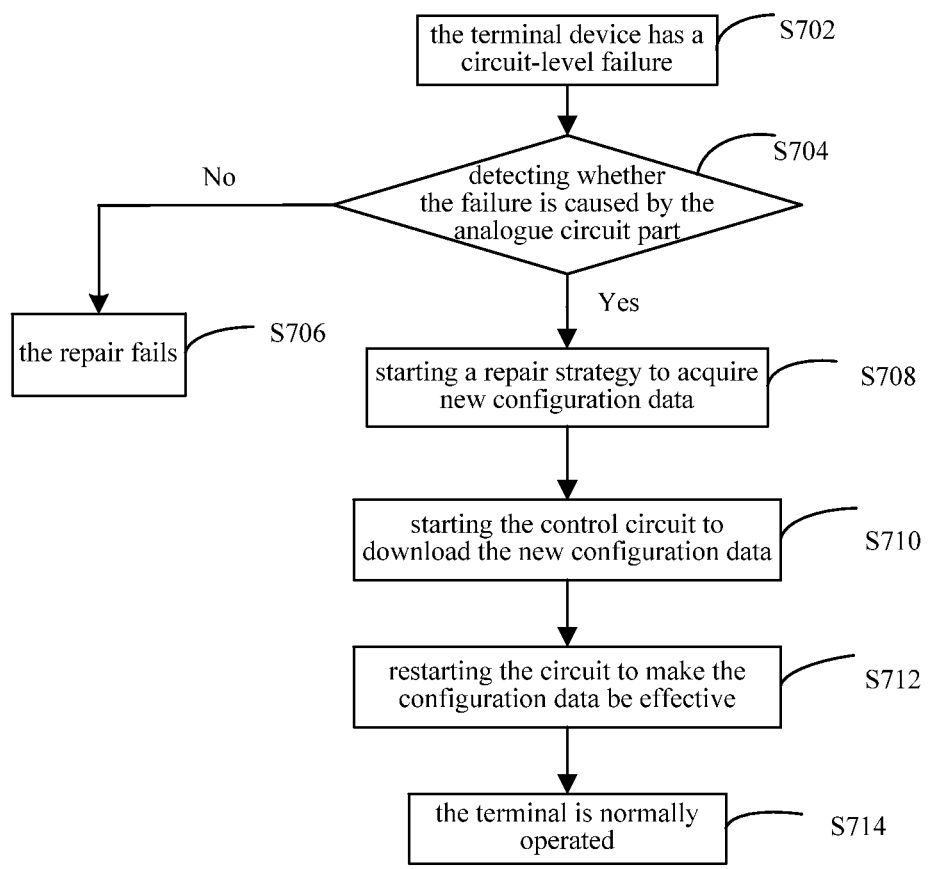
FIG. 7 shows a flowchart of a circuit failure repair method according to embodiment 4 of the disclosure.

FIG. 7 shows a flowchart of a method for repairing the circuit failure according to embodiment 4 of the disclosure. As shown in FIG. 7, when the circuit of the terminal device has a failure, the repair method for the configurable analogue array to realize the fault tolerance comprises the following steps.

Step S702, the terminal device has the circuit-level failure. For example, the parameters of the analogue circuit are shifted.

Step S704, detecting whether the generated failure is caused by the analogue circuit part in the terminal device, so as to determine whether to adopt the repair mechanism provided by the embodiment of the disclosure to repair; and if the failure is caused by the analogue circuit part, executing step S708, otherwise, executing step S706. For example, the part of the circuit which has the failure is detected, so as to determine whether the failure is caused by the analogue circuit part. If the failure is caused by the analogue circuit, the new configuration data is adopted to change the switch state of the programmable analogue array structure, and to bypass the failure unit.

Step S706, if the failure is not caused by the analogue circuit part, the repair cannot be implemented by the disclosure, and the failure repair fails.

Step S708, starting the repair strategy to acquire new configuration data. Specifically, first determining the position and the specific CAB unit on which the failure is generated, then using the interconnection network to bypass the failure position, and adopting other redundant CABs to replace the failed CAB unit. The new network relationship generates new configuration data.

Step S710, starting the control circuit, and downloading the new configuration data to the configuration data register, so as to change the circuit structure and realize the original circuit function.

Step S712, restarting the circuit, making the new configuration data be effective, and generating the new network structure. In this case, in the new network structure, the failed CAB or the failure line is bypassed and replaced by other redundant unit, and the target output needed by the circuit can be realized again after resetting the parameters.

Step S714, the analogue circuit failure in the terminal is repaired, and the device can be used again.

In view of this, this embodiment can realize the functional-level fault tolerance and repair of the circuit. That is, the failure can be repaired by configuring the storage register when the failure occurs, so as to realize the purpose of fast repairing and cost saving.

In conclusion, through the above embodiments, a method for realizing a configurable analogue circuit which has fault tolerance by using the analogue array structure solves the problem that the failure circuit component needs to be replaced when the terminal device is improperly used or is collided, which may cause long repair period and high repair cost. This solution enhances the fault tolerance of the system, and improves the resource utilization rate of the system.

Obviously, those skilled in the art should know that each of the mentioned modules or steps of the disclosure can be realized by universal computing devices. The modules or steps can be focused on single computing device, or distributed on the network formed by multiple computing devices. Alternatively, they can be realized by the program codes which can be executed by the computing device. Thereby, the modules or steps can be stored in the storage device and executed by the computing device. Under some circumstances, the shown or described steps can be executed in different orders, or can be independently manufactured as each integrated circuit module, or multiple modules or steps thereof can be manufactured to be single integrated circuit module, so as to be realized. Thus, the disclosure is not limited by any combination of the specific hardware and software.

The above is only the preferred embodiments of the disclosure and should not be used to limit the disclosure. For those skilled in the art, the disclosure can have various improvements and modifications. And any modifications, equivalent replacements, improvements within the principle of the disclosure shall fall within the scope of protection of the disclosure.

What is claimed is:

1. A terminal device, comprising a control device and a programmable analogue circuit device, wherein
    the control device comprises: an acquisition module, configured to acquire configuration data information corresponding to a function index and a parameter index of a target analogue circuit, wherein the configuration data information is configured to indicate on/off state of an interconnection switch between Configurable Analogue Blocks (CABs); a downloading module, configured to download the configuration data information to the programmable analogue circuit device; and a restart module, configured to restart the programmable analogue circuit device; and
    the programmable analogue circuit device comprises: a configurable analogue array module, configured to configure a parameter and/or a connection relationship of the CABS by using the configuration data information;
    wherein the acquisition module is further configured to acquire the configuration data information corresponding to the function index and the parameter index of the target analogue circuit by the following step: acquiring the configuration data information corresponding to the function index and the parameter index of the target analogue circuit through circuit simulation or manual debugging;
    wherein the acquisition module is further configured to acquire the configuration data information corresponding to the function index and the parameter index of the target analogue circuit through circuit simulation by the following steps: when the analogue circuit in the configurable analogue array has a failure, determining a line and/or a component which have/has the failure according to an input/output signal of the analogue circuit; and establishing a simulation circuit of the target analogue circuit by using the configurable analogue array to bypass the line and/or the component which have/has the failure, and acquiring the configuration data information of the target analogue circuit.

2. The terminal device according to claim 1, wherein the target analogue circuit comprises at least one of: a filter and an amplifier.

3. The terminal device according to claim 1, wherein the configurable analogue array module comprises the CABs, and the CABs comprise at least one of: a programmable capacitor array, a programmable resistor array, an operational amplifier and a programmable switch.

4. The terminal device according to claim 1, wherein the programmable analogue circuit device further comprises:
    a configuration data storage module, configured to store the configuration data information which is downloaded to the programmable analogue circuit device by the downloading module.

5. The terminal device according to claim 4, wherein the configuration data storage module is a configuration data register.

6. The terminal device according to claim 2, wherein the programmable analogue circuit device further comprises:
    a configuration data storage module, configured to store the configuration data information which is downloaded to the programmable analogue circuit device by the downloading module.

7. The terminal device according to claim 3, wherein the programmable analogue circuit device further comprises:
    a configuration data storage module, configured to store the configuration data information which is downloaded to the programmable analogue circuit device by the downloading module.

8. A method for realizing an analogue circuit in a terminal device, comprising:
    acquiring configuration data information corresponding to a function index and a parameter index of a target analogue circuit, wherein the configuration data information is configured to indicate on/off state of an interconnection switch between Configurable Analogue Blocks (CABs);
    downloading the configuration data information to a programmable analogue circuit device of the terminal device, wherein the programmable analogue circuit device comprises a configurable analogue array, configured to configure a parameter and/or a connection relationship of the CABs by using the configuration data information; and
    restarting the programmable analogue circuit device:
    wherein acquiring the configuration data information corresponding to the function index and the parameter index of the target analogue circuit comprises: acquiring the configuration data information corresponding to the function index and the parameter index of the target analogue circuit through circuit simulation or manual debugging;
    wherein acquiring the configuration data information corresponding to the function index and the parameter index of the target analogue circuit through circuit simulation comprises: when the analogue circuit in the configurable analogue array has a failure, determining a line and/or a component which have/has the failure according to an input/output signal of the analogue circuit; and establishing a simulation circuit of the target analogue circuit by using the configurable analogue array to bypass the line and/or the component which have/has the failure, and acquiring the configuration data information of the target analogue circuit.

9. The method according to claim 8, wherein establishing the simulation circuit of the target analogue circuit by using the configurable analogue array to bypass the line and/or the component which have/has the failure comprises:

using a redundant CAB in the configurable analogue array to replace the CAB which has the failure, and establishing the simulation circuit of the target analogue circuit.

10. The terminal device according to claim 6, wherein the configuration data storage module is a configuration data register.

11. The terminal device according to claim 7, wherein the configuration data storage module is a configuration data register.

* * * * *